May 27, 1958 — O. R. FENNEMA — 2,836,498
DRIED PIE PRODUCT AND METHOD OF PRODUCING THE SAME
Filed Oct. 29, 1956 — 2 Sheets-Sheet 1
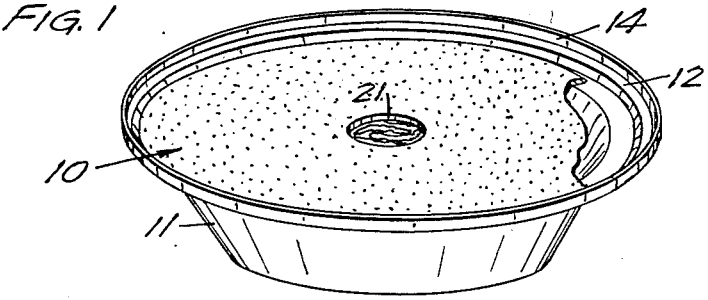
FIG. 1
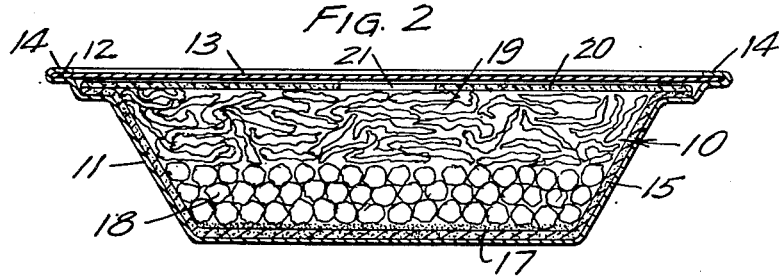
FIG. 2
FIG. 3
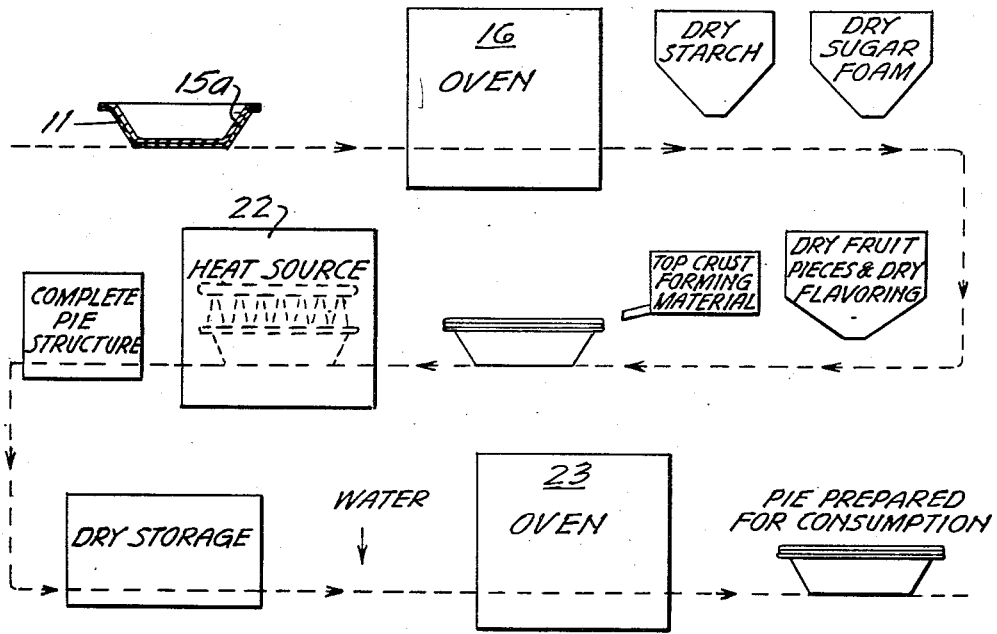
INVENTOR.
OWEN R. FENNEMA
BY
Williamson, Schroeder, Adams, & Meyers
ATTORNEYS May 27, 1958    O. R. FENNEMA    2,836,498
DRIED PIE PRODUCT AND METHOD OF PRODUCING THE SAME
Filed Oct. 29, 1956    2 Sheets-Sheet 2
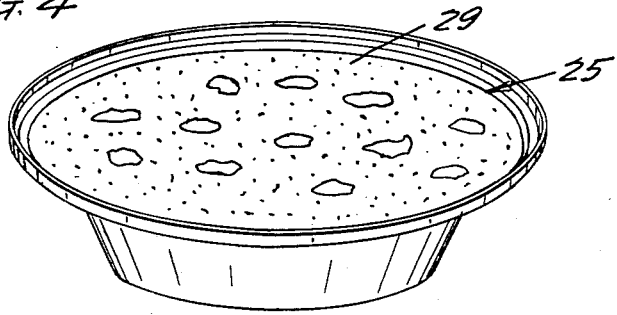
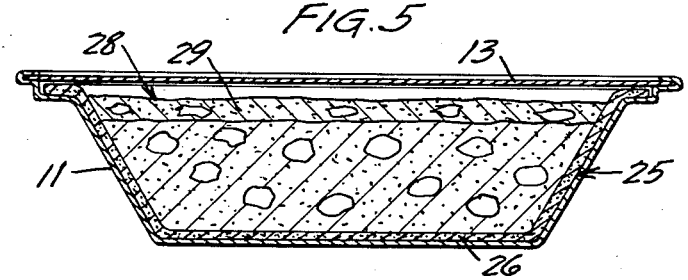
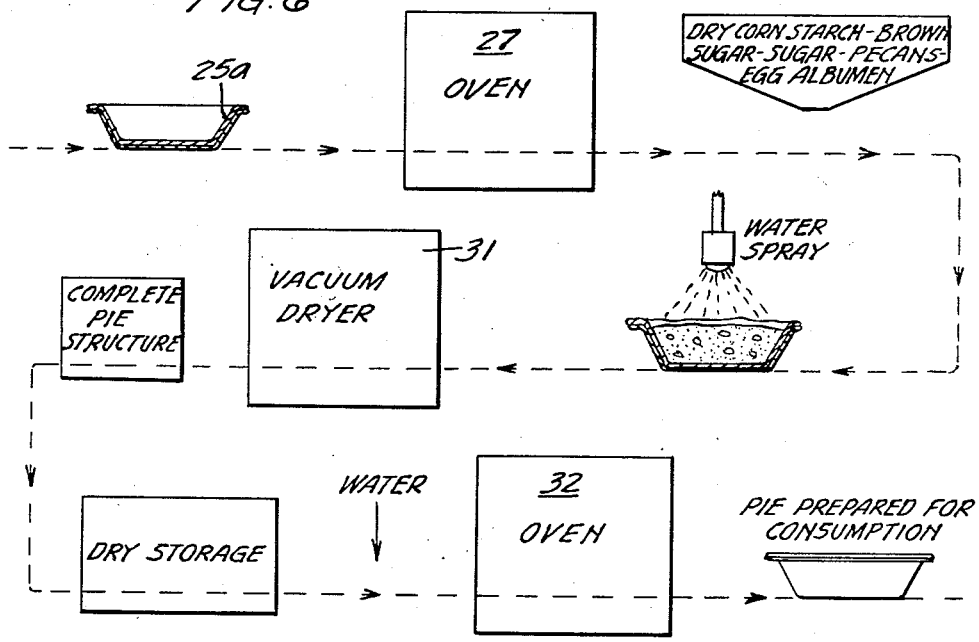
INVENTOR.
OWEN R. FENNEMA
BY
Williamson, Schroeder, Adams & Meyers
ATTORNEYS United States Patent Office 2,836,498
Patented May 27, 1958

2,836,498

DRIED PIE PRODUCT AND METHOD OF PRODUCING THE SAME

Owen R. Fennema, Minneapolis, Minn., assignor to Pillsbury Mills, Inc., Minneapolis, Minn., a corporation of Delaware Application October 29, 1956, Serial No. 619,043

13 Claims. (Cl. 99—199)

This invention relates to food products and to the method of production of such products and more specifically relates to pies which are easily stored and to the method of producing the same.

One of the major problems which has limited commercial production and sales of pies is the problem of storage of such pies. In storage, the moisture in a pie filling will penetrate and soak the pie crust, and as a result the pie crust will not have the desirable crispy and flaky characteristics of a freshly baked pie. Furthermore, most pie fillings must be refrigerated or they will become stale and may spoil.

With these general comments in mind, it is to the elimination of these and other disadvantages and to the provision of other novel features that my invention is directed.

An object of my invention is to provide a new and improved pie which is adapted to be stored without refrigeration for a substantial period of time.

Another object of my invention is to provide a novel method of producing a pie which may be stored without refrigeration for a substantial period of time and which may be readily and easily prepared for consumption subsequent to storage thereof.

Still another object of my invention is to provide a novel, substantially ready-to-bake and complete dried pie, which structure may be stored without refrigeration and which amy be quickly rehydrated during preparation for consumption.

A further object of my invention is the provision of a new, dry and readily hydratable complete fruit pie which structure may be stored for at least several weeks and which, when hydrated and prepared for consumption, has substantially all the desirable qualities of a freshly prepared fruit pie including the flakiness of the crusts.

These and other objects and advantages of my invention will more fully appear from the following description made in connection with the accompanying drawings wherein like reference characters refer to the same parts throughout the several views and in which:

Fig. 1 is a perspective view of one form of the pie in an opened container;

Fig. 2 is a vertical section view of the pie shown in Fig. 1 and showing the pie contained within a closed container;

Fig. 3 is a diagrammatic sketch showing the method steps in producing the pie shown in Figs. 1 and 2 and preparing the same for consumption;

Fig. 4 is a perspective view of another form of the pie comprising the present invention and being shown in an opened container;

Fig. 5 is a vertical section view of the pie shown in Fig. 4 and being contained in a closed container; and Fig. 6 is a diagrammatic sketch showing the method steps employed in producing the pie shown in Figs. 4 and 5 and in preparing the pie for consumption.

The present invention including the food product or pie structure and the method of producing the same provides a solution to the storage problems encountered in mass producing pies and subsequently distributing such pies through grocery stores and the like which may be located at substantial distances from the place of producing the pies. The pies disclosed herein are adapted for non-refrigerated storage and in substantially dry condition. The complete pie structures and the individual components thereof contain not more than 5% moisture. Each of the pie structures has a dried and partially baked lower crust, a quantity of dried filling material contained within the lower crust and being of the type which is to be cooked in a hydrated state in preparation for consumption and is readily hydratable during the cooking time. Each of the pie structures also includes means for retaining the filling material in the lower pie crust and such means comprise a dried upper crust over the filling material and secured to the lower crust and being constructed to be permissive of liquid passage therethrough so as to facilitate rehydration of the filling material.

Two specific examples showing varying application of the instant invention are given herewith:

*Apple pie*

The pie indicated in general by numeral 10 in Figs. 1, 2 and 3 is shown in a pie tin 11 which has an annular ledge 12 around the upper periphery thereof for supporting a cover member 13 thereon. The cover 13 is secured on the ledge 12 by a crimped flange 14 overlying the peripheral edge portion thereof. The pie tin 11 may be constructed of a light weight metallic sheet material and the flange 14 may be easily bent upwardly as shown in Fig. 1 to facilitate removal of the cover 13.

The pie structure 10 includes a lower pie crust 15 which may be made from a substantially conventional pie crust recipe. The pie crust 15 includes a quantity of material which retards moisture penetration and soaking and in the example given, such material comprises sodium caseinate. It is to be understood that the recipe examples cited herein apply to the production of pies in a five inch diameter aluminum foil tin with an eight ounce fluid capacity. One recipe which has been found to be successful is:

| | Percent |
|---|---|
| Salt | 1.65 |
| Sodium caseinate | 1.65 |
| Shortening | 26.20 |
| Flour | 52.50 |
| Water | 18.00 |

The pie dough is made by mixing the salt, flour and sodium caseinate, subsequently cutting the shortening into this dry mixture, and subsequently mixing with the water. The pie dough is rolled out to approximately one sixteenth inch thickness and is placed in the pie tin and the lower pie crust is then inserted in an oven 16 for applying baking heat. It has been found advisable to place a weighted and perforate pie tin over the dough 15a during the preliminary stages of baking to prevent bubbles from forming in the crust. The lower pie crust is substantially dried in the oven to contain not more than five per cent moisture and is removed from the oven 16 before browning of the crust occurs. It has been found to be successful to bake the lower pie crust 15 in an oven at three hundred and fifty degrees Fahrenheit for eleven minutes with the weighted pie tin on the crust. The top pie tin is then removed and baking is continued for approximately three more minutes, or for as long as possible without browning the crust. The moisture content should then be below five percent.

The pie 10 also includes a layer 17 of material overlying at least the central portion of the lower pie crust 15, and the material in the layer is capable of retarding moisture penetration therethrough to retard moisture absorption by the lower crust. The material in layer 17 may comprise granular starch, and by way of example it has been found successful to place 5.0 grams of American Maize Starch ARD 721-A on the bottom crust.

The pie 10 also includes a stratum 18 of dry and readily hydratable bulk material having an extremely low specific gravity to occupy the substantial volume and being capable of collapsing when liquid is added thereto. In the example given herein, stratum 18 includes approximately 15 grams of pieces of sugar foam which has a specific gravity of approximately 0.2 to 0.3 and which pieces are sized similar to one-half inch cubes. It is preferable that the sugar foam contain small quantities of starch to hold the sugar foam in puffed condition. Sugar foam is a commercially available product, but such commercially available sugar foam has not previously included starch as one of its components. The desired sugar foam may be prepared by boiling a mixture of sixty parts sugar (sucrose), ten parts corn syrup (which contains starch) and thirty parts water until the temperature reaches approximately two hundred seventy degrees Fahrenheit. A vacuum of twenty-eight inches is applied to this mixture until boiling ceases to remove most of the remaining moisture without carmelizing the sugar. The vacuum is then released and the product is whipped with a mixer employing a substantially conventional cake batter agitator until thin threads of sugar begin to form from the agitator. Vacuum is again applied to the product and the product is allowed to stand, approximately ten to fifteen minutes, until firm. After the sugar foam has hardened, it has the desired specific gravity and the hardened mass of sugar foam is then broken into pieces which are randomly shaped and are of the size indicated. The purpose of the sugar foam stratum 18 will be fully brought out hereinafter and the desirability of having a quantity of starch therein will also be more fully explained. It should be noted that the sugar foam is instantaneously collapsible when liquid is applied thereto.

The pie 10 also includes a stratum 19 of dried and readily rehydratable fruit pieces overlying the sugar foam stratum 18, and the fruit pieces of stratum 19 are of the type to be cooked in a hydrated state in preparation for consumption and are hydratable during the time of cooking. In this example, the stratum 19 comprises dried apple pieces, each of which contains not more than five percent moisture and each of which comprises a cellular body having a relatively tough integral sheathing which is ruptured discontinuously to expose substantial surface area to facilitate ready rehydration of the entire apple piece. It has been found that Gravenstein apples are highly successful for use in the present pie where the time of rehydration is important and it has been found preferable to treat the apples in drying in the manner set forth in application for United States Letters Patent Serial Number 553,313 filed December 15, 1955, by John H. Forkner. Briefly, the apple pieces in that process are initially dried in a kiln, and are then mechanically treated to produce flattening and discontinuous rupturing of the integral outer sheathing of the pieces, and are then dried again to very substantially reduce the moisture content. Approximately forty grams of such dried apple pieces which are approximately three-eighths to one-half inch cubes, but are randomly shaped, comprise the stratum 19. The suggested size of apple pieces substantially expand when subsequently rehydrated and the apple pieces are definitely perceptible in the finished product after preparing for consumption.

It should however, be noted that standard vacuum dried apples (which is a commodity well known to the trade) perform satisfactorily if used in sufficiently fine pieces to provide a substantially increased surface area to facilitate rapid rehydration.

The pie 10 also includes dry flavoring ingredients which may be spread evenly over the apples and will of course fall down at least between some of the apple pieces in the stratum 19.

In the form shown, approximately 30.0 grams of fine granulated sugar, 0.13 gram of salt, 0.13 gram of cinnamon, and 0.1 gram of nutmeg are mixed and spread over the apple stratum 19. It should be understood that these flavoring ingredients may be varied or eliminated according to the taste desired.

The pie 10 also includes means defining a top crust sealed to the peripheral edge portion of the lower crust 15 and overlying the stratum 19 to retain the filling materials in the lower crust. In this pie, the top crust 20 is formed of pie dough identical to that of the lower crust 15. The top crust dough is applied over the stratum 19 and the peripheral edge portion is sealed to the peripheral edge portion of the lower crust 15 by means of water or egg white. An opening or aperture 21 is then formed in the center of the upper pie crust dough to cause the upper pie crust to be permissive of liquid passage therethrough for supplying liquid such as water to the filling materials, including the apple pieces, the sugar foam pieces, the starch and flavoring ingredients. In the form shown, the opening 21 is approximately one inch in diameter. The pie is then inserted into an oven 22 and baking heat is applied at least to the top of the pie to dry the top crust 20 to less than five percent moisture and to securely bond the top pie crust 20 to the dried lower crust 15. The entire pie may be baked in the oven or infra-red heat may be applied to the top crust. It has been found satisfactory to bake the pie at approximately three hundred fifty degrees Fahrenheit for eight to ten minutes. The pie should be removed from the baking heat before browning of the upper crust 20 occurs.

The apple pieces of stratum 19 may absorb small quantities of moisture from the pie dough of the upper crust 20 before the same is baked but the moisture absorbed by the apple pieces is removed during the baking of the upper crust. One of the primary reasons for arranging the sugar foam in a stratum 18 below the fruit piece stratum 19 is to prevent absorption by the sugar foam of moisture from the upper crust pie dough before the latter is dried. The stratum 19, being interposed between the stratum 18 and the upper crust 20, prevents moisture from the upper crust 20 from reaching the sugar foam.

When the upper crust is dried, the pie 10 is complete and is ready for storage in a non-refrigerated but dry condition. In the example given, the lid 13 will then be placed upon the annular shelf 12 and the annular flange 14 is crimped down onto the lid. It should be understood that the pie 10 may be stored in any other suitable type of moisture-proof container and may be enclosed in a moisture-proof bag in addition to the covered pie tin.

The sugar foam stratum 18 provides structural support for the central portions of the upper pie crust 20 so as to prevent buckling thereof. The chamber between the upper and lower pie crusts is full in spite of the fact that the fruit or apple pieces must subsequently be allowed to expand when liquid is added thereto, and this expansion is provided for by the collapsing of the sugar foam when moisture is added.

When the pie 10 is to be prepared for consumption, of course the lid or cover 13 will be removed from the pie tin. A quantity of hot water is poured through the opening 21 in the upper crust 20 to rehydrate the fruit pieces in stratum 19 and the sugar foam pieces in stratum 18. In the example given, 100 cc. of water at one hundred thirty degrees Fahrenheit is poured into the pie. The pie is then immediately inserted into a baking oven 23 and the pie is baked at four hundred fifty degrees Fahrenheit for ten minutes. At that time an additional 20 cc. of one hundred thirty degree Fahrenheit water is poured through the opening 21 and the baking of the pie continues at three hundred fifty degrees Fahrenheit for an additional thirty minutes. It has been found that the crust of the pie will be browned to approximately the desired degree at this baking time. Of course it should be recognized that the pie crust should not be excessively browned and should be removed from baking heat before this occurs.

When the water is added in preparation for consumption, the dried apple pieces in stratum 19 immediately start rehydrating and expanding. A portion of the first water added into the pie passes downwardly to the sugar foam stratum causing hydration thereof which results in substantially instantaneous and complete collapsing of the sugar foam pieces. When the sugar foam pieces collapse, less volume is occupied thereby and substantial volume is provided into which the apple pieces of stratum 19 may expand. A quantity of water passes downwardly to the starch layer 17 and is retarded by this layer from rapid penetration of the lower pie crust 15. In addition, the small quantity of sodium caseinate in the pie crust also retards absorption by the pie crust of water.

Because the pie is subjected to baking heat immediately after water is supplied into the pie, the filling materials readily commence to cook. The sugar foam from stratum 18 substantially dissolves and during the cooking of the filling materials, the starch 17 eventually dissolves and later gelatinizes to make the filling material less fluid.

When the baking of the pie is finished, the pie has the appearance and qualities of a freshly baked pie using fresh apples and with the same flavor advantages.

*Pecan Pie*

The pie indicated in general by numeral 25 is shown in Figs. 4 and 5 and is related to the diagrammatic sketch of Fig. 6 and may be contained in a pie tin 11 having a cover 13 which is identical to the pie tin and cover shown in Figs. 1 and 2. The pie 25 has a lower pie crust 26 which contains a small quantity of material to restrict moisture absorption thereby and is otherwise made of a conventional pie dough recipe. The pie crust 26 may be made identical to the pie crust 15 shown in and described in connection with Figs. 1, 2 and 3. The pie dough is rolled out and placed in a pie tin as indicated at 25a and is then inserted into an oven 27 to be baked until substantially dry, and the lower pie crust is removed from the oven 27 before browning of the crust occurs.

A quantity of dry ingredients or filling material 28 is then placed upon the bottom crust 26. These ingredients include dry corn starch which may be placed in a layer on the lower crust, depending upon the rate at which the other dry ingredients in the filling material hydrate. If the other dry ingredients hydrate relatively slowly the corn starch layer will be used to prevent liquid penetration into and soaking of the lower crust. In the example given, the corn starch is mixed with the other dry ingredients and dispersed substantially uniformly therethrough. In the pecan pie disclosed, the ingredients include:

|  | Grams |
|---|---|
| Dry egg albumen | 2.0 |
| Corn starch | 4.6 |
| Brown sugar | 51.5 |
| Fine granulated sugar | 28.7 |
| Chopped pecans | 30.5 |
|  | 117.3 |

It should be understood that this recipe is only exemplary and is not limiting to the invention and it should also be understood that the recipe is in reference to a pie made in a five inch diameter aluminum foil tin with an eight fluid ounce capacity.

It is necessary that the dry filling material 28 include a quantity of sugar dispersed substantially uniformly throughout at least in upper stratum 29 of the filling materials 28. The upper stratum 29 in the finished pie structure 25 is hardened and dried to provide an upper crust which is secured to the peripheral edge portion of the lower pie crust 26. The sugar in the stratum 29 bonds together and to the pie crust to provide this rigid stratum or crust. The rigid crust 29 is permissive of water passage therethrough because the crust is porous and because the crust disintegrates or collapses when liquid is added thereto because of dissolving of the sugar.

The hardened upper stratum or crust 29 is produced by applying a crust-forming media or material over the top of the dry granular filling material 28 and then drying, as by applying baking heat, the top of the pie. More particularly, the formation of the hardened material-confining crust 29 is carried out by directing a fine spray of water as indicated at 30 in Fig. 6 onto the top of the filling material 28. The spray of water added moistens the top of the filling material and defines a wetted stratum. The sugar adjacent the top of the filling material is at least partially dissolved so as to intimately contact other ingredients of the filling material and the peripheral edge portion of the lower pie crust 26. After the top of the filling material is wetted, the pie 25 is dried in any manner which does not cause browning of the pie crust. It has been found to be satisfactory to place the pie in a vacuum dryer 31 having approximately twenty-eight inches of vacuum and to heat the pie to approximately one hundred forty degrees Fahrenheit until the top surface of the filling material is dry, and this has been found to take approximately three hours.

This dry and readily hydratable complete pie structure may then be stored in a non-refrigerated but dry condition to facilitate shipment and distribution and until the pie is to be prepared for consumption. The covered pie tin will maintain the pie in dry condition or other suitable moisture-proof containers may be used to store the pie. Of course the dry filling materials in the pie will be kept in place by the hard crust 29.

When the pie is to be prepared for consumption, a quantity of liquid is poured upon the top of the crust 29 and the pie is immediately subjected to baking heat. In the form shown, approximately one-half cup of hot water having a temperature of approximately one hundred fifty degrees Fahrenheit to two hundred twelve degrees Fahrenheit is poured onto the crust 29. The pie is then inserted into an oven 32 and is baked at approximately three hundred seventy five degrees Fahrenheit for twenty to thirty minutes.

When the water is first added, the crust or rigid top stratum 29 collapses and some of the ingredients are immediately dissolved. The hydrated filling material cooks when the pie is in the oven 32 to produce a finished product extremely similar in taste and quality to a freshly prepared pie. During the cooking of the hydrated filling material the bottom crust 26 is prevented from rapidly absorbing water because of the sodium caseinate therein.

It will be seen that I have provided a dry and complete pie structure which is well adapted for non-refrigerated dry storage and which has a dry and difficultly hydratable lower pie crust or shell containing a quantity of dry filling material of the type to be cooked in preparation for consumption and which is hydratable during the time of cooking and the pie structure also includes a dry material-confining upper crust which is sealed to the lower pie crust and is permissive of liquid passage therethrough to facilitate the supplying of liquid to the hydratable filling material during preparation of the pie for consumption.

It should also be noted that I have provided in the art of producing a ready-to-bake and easily stored pie, a method consisting in the steps of forming and drying a lower pie crust; placing dry and readily hydratable filling materials in the lower pie crust, applying crust-forming material over the filling material and drying the top of the pie to produce an upper material-confining crust secured to the entire periphery of the lower pie crust.

It will, of course, be understood that various changes may be made in the form, detail, arrangement and proportion of the parts without departing from the scope of my invention which consists of the matter described herein and set forth in the appended claims.

What is claimed is:

1. A substantially ready-to-bake and complete edible pie structure comprising a dried lower crust having a peripheral edge portion, a dried and liquid pervious, material-confining upper crust secured to the peripheral edge portion of said lower crust and defining a material chamber therebetween, and a quantity of substantially dry and readily hydratable filling material within the chamber, the crust and filling material containing not more than 5% moisture, whereby the pie may be easily stored and moisture may be subsequently added through the upper crust in the preparation for consumption.

2. A ready-to-bake complete edible pie structure comprising a dried and difficultly hydratable lower crust having an upturned peripheral edge portion, a quantity of dried and readily hydratable filling material on the lower crust, and a dried and water pervious, material-confining crust overlying the filling material and being secured to the peripheral edge portion of the lower crust, the crust and filling material containing not more than 5% moisture, whereby liquid may be added through the pervious upper crust in preparation of the pie for consumption.

3. A completely edible ready-to-bake edible pie structure comprising a dried lower crust having a peripheral edge portion, a dried and water pervious, material-confining upper crust secured to the peripheral edge portion of said lower crust and defining a material chamber therebetween, and a quantity of substantially dry and readily hydratable filling material within the chamber, said filling material being of the type to be cooked in a hydrated state before consumption and also being capable of complete hydration during the time of cooking, and the crust and filling material containing not more than 5% moisture.

4. An edible pie comprising an enclosing and material-confining perforate pie crust, and a quantity of dried and readily rehydratable filling material in the crust, the crust and filling material containing not more than 5% moisture, whereby liquid may be added to the filling material through the perforate crust in preparation for consumption.

5. A ready-to-cook complete edible pie structure comprising a dried lower crust having a peripheral edge portion, a layer of material capable of retarding moisture penetration therethrough, said material layer overlying the lower crust, a dried and perforate material-confining upper crust secured to the peripheral edge portion of the lower crust and defining a material chamber therebetween, and a quantity of substantially dry and readily hydratable filling material within the chamber, the lower crust, material layer, upper crust and filling material containing not more than 5% moisture, whereby the pie may be stored in a dry state and when liquid is subsequently added through the perforate upper crust, the lower crust is protected from soaking by said layer.

6. A ready-to-bake complete edible pie structure comprising a dried lower crust containing a quantity of sodium caseinate to restrict moisture absorption by the crust, said lower crust having a peripheral edge portion, a dried material-confining upper crust secured to the peripheral edge portion of the lower crust and defining a material chamber therebetween, and a quantity of substantially dry and readily hydratable filling material within the chamber, the crust and filling material containing not more than 5% moisture, whereby liquid may be added through the perforate upper crust in preparation of the pie for consumption.

7. In the art of producing an edible pie adapted for non-refrigerated storage, the method steps consisting in forming from crust-forming material a lower pie crust, applying baking heat to the crust until the crust contains not more than 5% moisture, removing the crust from the baking heat before browning occurs, placing filling material containing not more than 5% moisture on the dried lower crust and filling the crust therewith, applying crust-forming material over the dry filling material and in engaging relation with the edge of lower crust, and baking at least the top of the pie to dry the same to a moisture content of not more than 5% and to produce a dried upper crust secured to the lower crust.

8. A food product comprising a pie having a dried lower crust with a peripheral edge portion, a dried water pervious, material-confining upper crust secured to the peripheral edge portion of the lower crust and defining a material chamber therebetween, a quantity of dried and readily hydratable filling material of the type which expands when hydrated, and a quantity of dry and readily hydratable, sugar foam which occupies a large volume in relation to its low weight and is instantaneously collapsible upon addition of moisture thereto, said sugar foam and said filling material being confined within the chamber for supporting the upper crust, the crust, sugar foam and filling material containing not more than 5% moisture whereby the sugar foam collapses and the fruit filling expands when moisture is added in preparation of the pie for consumption.

9. A substantially ready-to-bake and complete pie structure having in combination, a dried lower crust with a peripheral edge portion, a dried liquid pervious, material-confining upper crust sealed to the peripheral edge portion of said lower crust and defining a material chamber therebetween, and a quantity of dried and readily rehydratable fruit pieces in the chamber and each of said fruit pieces comprising a cellular body having an integral sheathing ruptured discontinuously to expose substantial surface area and thereby facilitating quick absorption of moisture upon application of liquid through the perforate upper crust, and the crust and fruit pieces containing not more than 5% moisture.

10. A complete edible pie structure readily preparable for consumption, comprising a dried lower crust having a peripheral edge portion, and a dry and readily hydratable filling material on the crust and defining a material-confining upper crust secured to the peripheral edge portion of the lower crust, said filling material being of the type to be cooked in a hydrated state in preparation for consumption, and the crust and filling material containing not more than 5% moisture.

11. In the art of producing a readily preparable complete edible pie from pie crust dough and dry filling ingredients including sugar, which filling ingredients contain not more than 5% moisture, the method steps consisting in forming from the dough a lower pie crust, applying baking heat to the lower pie crust to dry the same to a moisture content of not more than 5%, removing baking heat from the crust before browning of the crust occurs, placing the filling ingredients containing not more than 5% moisture on the dried lower pie crust, spraying liquid on the filling ingredients to produce a wetted top stratum and to at least partially dissolve the sugar therein, and drying the wetted top stratum to a moisture content of not more than 5% to harden and rigidify the top stratum and cause bonding thereof to the pie crust, whereby to produce a pie adapted for non-refrigerated dry storage.

12. In the art of producing a ready-to-bake complete edible pie from pie dough, sugar foam pieces containing not more than 5% moisture and fruit pieces containing not more than 5% moisture, the method steps consisting in forming from the dough a lower pie crust, applying baking heat to the lower pie crust for drying the same to a moisture content of not more than 5%, removing the baking heat from the crust before browning of the crust occurs, placing a stratum of sugar foam pieces containing not more than 5% moisture in the lower pie crust, placing a stratum of fruit pieces containing not more than 5% moisture in the lower pie crust over the sugar foam stratum, forming from the dough an upper pie crust, applying the upper pie crust over the stratum of fruit pieces and sealing the upper pie crust to the lower pie crust, applying baking heat at least to the upper pie crust to dry the same to a moisture content of not more than 5% and produce bonding of the upper crust to the lower pie crust, and removing the baking heat from the upper pie crust before browning thereof occurs.

13. A ready-to-bake complete edible pie, comprising a dried lower crust with a peripheral edge portion, a dried and liquid-pervious material-confining upper crust sealed to the peripheral edge portion of the lower crust and defining a material chamber therebetween, a quantity of dried and readily rehydratable fruit pieces in the chamber, said fruit pieces substantially expanding when hydrated, and a quantity of dry sugar foam pieces in the chamber for supporting the upper crust, said sugar foam pieces being collapsible upon addition of moisture thereto, to permit expansion of the fruit pieces, the crust, fruit pieces and sugar foam pieces containing not more than 5% moisture whereby the pie may be stored without refrigeration and may be rehydrated in preparation for consumption.

References Cited in the file of this patent

UNITED STATES PATENTS

| | | |
|---|---|---|
| 1,624,490 | Kaser | Apr. 12, 1927 |
| 2,363,395 | Calia | Nov. 21, 1944 |
| 2,506,358 | Harrel et al. | May 2, 1950 |
| 2,541,859 | Callaghan et al. | Feb. 13, 1951 |
| 2,586,945 | Harrel et al. | Feb. 26, 1952 |
| 2,771,364 | Chase et al. | Nov. 20, 1956 |

OTHER REFERENCES

"Everybody's Cook Book," 1924, by Lord, Henry Holt and Co. (New York), pp. 587, 591 relied on.